US007380241B2

(12) United States Patent
Burdick et al.

(10) Patent No.: US 7,380,241 B2
(45) Date of Patent: May 27, 2008

(54) SCALABLE AND IMPROVED PROFILING OF SOFTWARE PROGRAMS

(75) Inventors: Dean Joseph Burdick, Austin, TX (US); Suresh Eswara Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 11/006,370

(22) Filed: Dec. 7, 2004

(65) Prior Publication Data

US 2006/0123400 A1    Jun. 8, 2006

(51) Int. Cl.
  *G06F 9/45*    (2006.01)
(52) U.S. Cl. ........................ 717/136; 711/165
(58) Field of Classification Search ................. 717/136; 711/165
  See application file for complete search history.

(56) References Cited

U.S. PATENT DOCUMENTS

| 5,671,405 | A | * | 9/1997 | Wu et al. ....................... 707/7 |
| 5,721,956 | A | * | 2/1998 | Martin et al. .................. 710/52 |
| 6,341,371 | B1 | | 1/2002 | Tandri ........................... 717/5 |
| 6,728,955 | B1 | * | 4/2004 | Berry et al. ................. 717/158 |
| 7,007,146 | B2 | * | 2/2006 | Romanufa et al. ........... 711/165 |
| 2004/0123084 | A1 | * | 6/2004 | DeWitt et al. ............... 712/227 |
| 2004/0139440 | A1 | | 7/2004 | Browning et al. ........... 718/107 |

OTHER PUBLICATIONS

U.S. Appl. No. 09/620,722, filed Jul. 20, 2000, Browning et al.
U.S. Appl. No. 09/620,714, filed Jul. 20, 2000, Browning et al.

* cited by examiner

*Primary Examiner*—John Chavis
(74) *Attorney, Agent, or Firm*—VanLeeuwen & VanLeeuwen; Matthew W. Baca (57) ABSTRACT

A method for profiling software programs uses a small pinned buffer and a large unpinned histogram buffer. When a process that is being profiled receives a time slice, the process' program counter is written to the small pinned buffer by a kernel routine. The small pinned buffer is configured to be large enough to store several program counters. When the small pinned buffer is full, or almost full, an internal profiling signal is sent by the kernel routine. When the process is resumed, any outstanding signals (including the profiling signal) are processed before resuming the process. The profiling signal is handled by reading the program counters from the small pinned buffer, calculating a slot in the histogram buffer that corresponds to each of the program counters, incrementing the value in the corresponding histogram slots, and clearing the small pinned buffer so that it can be reused.

1 Claim, 7 Drawing Sheets

SCALABLE AND IMPROVED PROFILING OF SOFTWARE PROGRAMS

BACKGROUND OF THE INVENTION

1. Technical Field

The present invention relates in general to a system and method for profiling software programs. More particularly, the present invention relates to a system and method for writing profile data to a small pinned buffer that is used to update a larger histogram buffer.

2. Description of the Related Art

Profiling software is the process of analyzing the performance of software. Profiling can be used to detect patterns of use, to verify performance, to optimize code, to identify data corruption and to expose memory leaks or excessive resource demands. Components of a large system can be profiled individually or together. Profiling is accomplished through software tools—software that runs and/or instruments the application under study.

There are at least two traditional methods for profiling software. First, many traditional UNIX-like operating systems, such as IBM's AIX™ operating system, support a profil( ) system call. The profil( ) system call registers a memory array with the kernel along with a scale factor that determines how the program's execution address space maps into the array. For example, using a scale factor of 1:1 would profile every program counter, while a scale factor of 2:1 would group every two program counters (i.e., the first and second instructions would be profiled together, the third and fourth instructions would be profiled together, etc.). While increasing the scaling factor reduces the accuracy of the profiling, it also uses less memory since the histogram buffer for a 2:1 scaled profile is roughly half as large as a 1:1 scaled profile.

When a profiled program is executing, the value of the program counter is examined at some periodic interval (such as every time slice interrupt) and the corresponding slot in the histogram buffer (memory array) is incremented. Because the examination of the program counter and incrementing of the corresponding slot is performed by the kernel at interrupt time, the histogram buffer passed by the program in the profil( ) system call is pinned in real memory. In addition, the clock (or time slice) interrupt routine determines the corresponding slot in the histogram buffer that needs to be incremented based upon the program counter. Determining the correct slot can be somewhat computationally intensive, especially for larger (e.g., 64 bit) addresses. Thus, a challenge of the prior art is that significant system overhead, in terms of system resources and time, are associated with profiling a program.

Furthermore, pinning the entire histogram buffer causes additional challenges in that the histogram buffer may be as large as half the size of the text area of the program that is being profiled. One of these additional challenges is that the kernel is exposed to potential security attacks, such as a denial of service attack, because an ordinary user's program can pin large amounts of memory by directly calling the profil( ) system call and passing in a large histogram buffer or by profiling a program with a very large text area (i.e., execution address space). Another challenge of pinning a large histogram buffer is that there is little or no scalability. Thread-level profiling does not work well for a large number of threads because each thread of the process requires its own large pinned buffer.

A second method for profiling programs in some operating systems that do not support a profil( ) system call, such as some versions of the Linux™ operating system, is for a signal call to be installed for a signal, usually "SIGALRM," and for an interval timer to be allocated for the process to periodically deliver the signal to the process at the same frequency at which the program counter needs to be examined. The signal handler receives the execution context of the thread at the point when it was interrupted by the signal. The signal handler then performs the operation of extracting the program counter from the execution context and incrementing a slot in a memory array (the histogram buffer) based on the value of the program counter. This method is advantageous in that the user buffer does not have to be pinned in memory since it is updated in process (non-interrupt) mode. However, a challenge of this method is that it requires a signal to be delivered to user space every time a sample is taken, and consequently, requires considerably more overhead than kernel-based profiling (described as the first method above). An additional challenge is that this method requires that the process install its own signal handler which would effectively overlay the functionality provided by the profiling-based signal handler. The most serious challenge of this method, however, is that this method is less accurate as compared to kernel-based profiling because of the variability associated with signal delivery latencies. Because of the aforementioned challenges, signal-based profiling is not as popular as kernel-based profiling.

What is needed, therefore, is a system and method that maintains the efficiency and accuracy of kernel-based profiling without requiring a large pinned buffer to store the histogram data.

SUMMARY

It has been discovered that the aforementioned challenges are resolved using a system and method that provides a small pinned buffer, typically 400 bytes or less, for processes that are being profiled. At regular intervals, such as at the end of the process' time slice, the current program counter of the profiled program is saved to the small pinned buffer. When the small pinned buffer is almost full, the kernel sets a signal. When the small pinned buffer is almost full, the kernel sends an internal to the process. When the profiled process is resumed for the next dispatch, the kernel's resume routine checks to see if any internal signals are pending in addition to any external signals. If any internal signals are pending, it passes control to the appropriate internal kernel signal handler. The kernel signal handler processes the entries stored in the small pinned buffer, updates a larger non-pinned buffer used to store histogram data for the profiled process, and clears the small pinned buffer by resetting a counter so that the next profiled program counter will be written to the first slot in the small pinned buffer.

By using a small pinned buffer, the system's vulnerability to denial of service attacks by rogue programs pinning large buffers is reduced without sacrificing accuracy. Writing the program counter value to the small pinned buffer reduces the time traditionally taken to compute the slot in the histogram buffer, read the value from the computed slot and increment it, and write the incremented value back to the computed slot, thus reducing or eliminating any impact of profiling in the interrupt handlers. In addition, the invention is scalable because the size of the small pinned buffer can be adjusted based upon factors such as the number of processes (threads) being profiled and any system memory constraints currently being encountered by the system. Finally, impact to the program being profiled is minimized because the actual computation to the slot in the histogram buffer and the update to the histogram buffer are performed less frequently since the profiled program counters are stored in the small pinned buffer and only processed when the buffer is almost full. This results in a run of the profiled program being more similar to a run of the program when its not being profiled.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
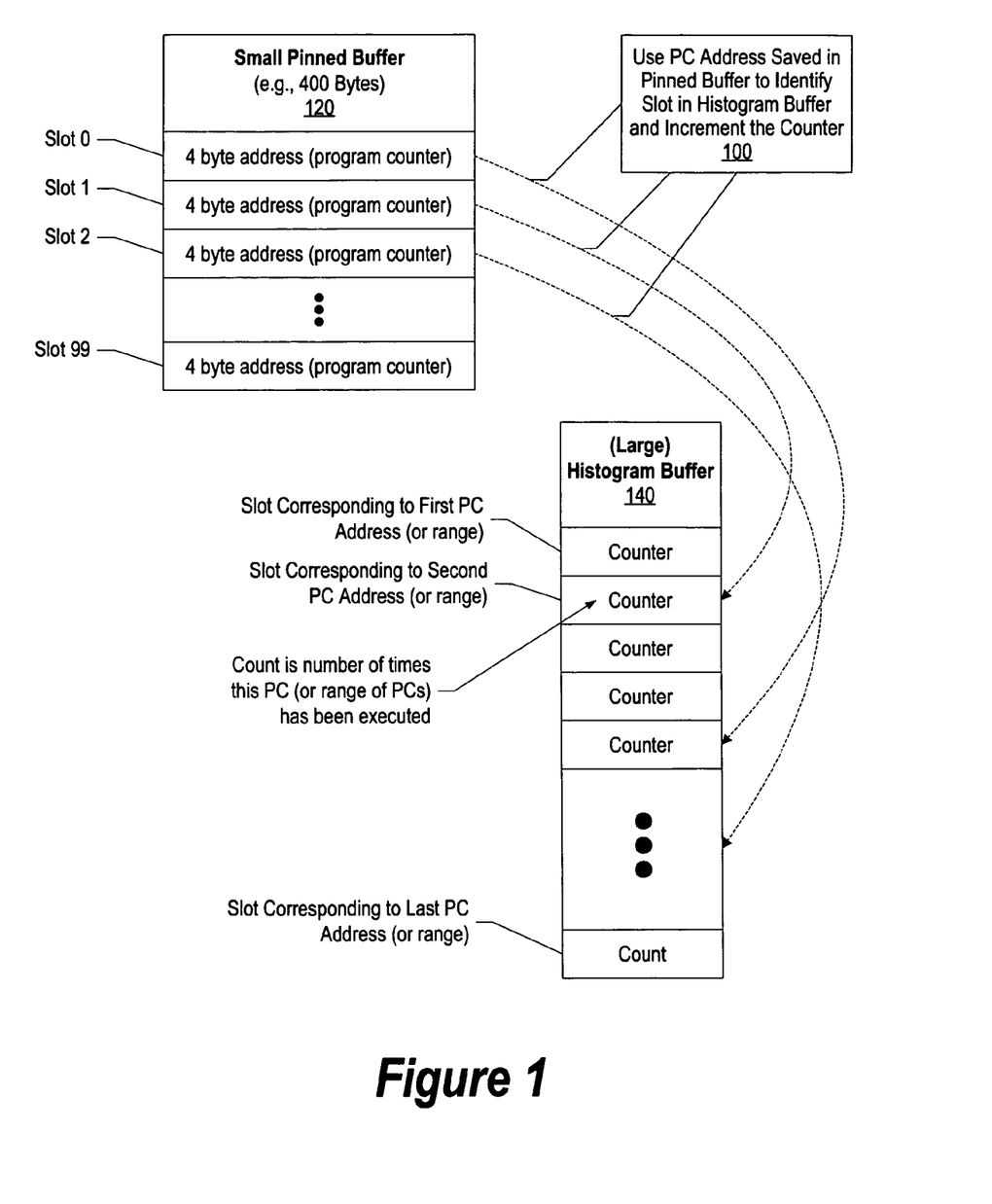
FIG. 1 is a diagram showing a small pinned buffer being used to update a large non-pinned histogram buffer.

FIG. 1 is a diagram showing a small pinned buffer being used to update a large non-pinned histogram buffer.

Small pinned buffer 120 is used to store the program counters for a program that is being profiled. The kernel sets up a small pinned buffer for each process (thread) that requests profiling. As used herein, the terms "program," "process," and "thread" are used interchangeable unless otherwise noted by the context. These terms are used to describe a unit of execution that can be profiled.

In many systems, this unit of execution is called a "thread," while in other systems, the unit of execution is called a "process" or a "program." In a multi-threaded system, a single program can be divided into a multitude of "threads" with each thread operating somewhat independent of the other threads. In these systems, a program may wish to profile a particular thread within the program in order to discover inefficiencies or bugs in the particular thread.

The size of small pinned buffer 120 is scalable and can be adjusted based upon factors such as the number of threads being profiled and any system memory constraints currently being encountered by the system. In a 32-bit system using 32-bit (4 byte) addressing, each slot of the small pinned buffer is 4 bytes wide so that each slot in the small pinned buffer can accommodate a 32-bit address. In one embodiment, a standard small pinned buffer is 400 bytes in size and, thus, able to store up to 100 program counters when using 32-bit addresses (4 bytes/program counter×100=400 bytes). The number of available slots for a given small pinned buffer size, of course, depends on the address size. In a system that uses 16-bit addressing, 200 bytes would be allocated to the small pinned buffer in order to store 100 entries, while in systems using 64-bit addressing, 800 bytes would be allocated to the small pinned buffer.

The first program counter that is encountered during profiling is stored in slot 0 of the small pinned buffer. The next program counter is stored in the next slot (slot 1), and so on. Using a small pinned buffer that is 400 bytes in size with 32-bit addressing, the last slot is numbered slot 99, for a total of 100 slots. Before small pinned buffer 120 is full, however, kernel process 100 processes the small pinned buffer and updates large histogram buffer 140. Further details regarding process 100 can be found, among other places, in FIG. 6 and the detailed description corresponding thereto.

Large histogram buffer 140 has a slot for each program counter, or range of program counters, that correspond to the program being profiled. A program counter corresponds to each executable machine instruction in the program. A program written in a high-level language like 'C' or FORTRAN is converted into a machine-level language using a procedure called compilation. Each instruction of the machine level language corresponds to a program counter. The number of machine-level language instructions are often 5-10 times larger than number of lines in the high-level language. Oftentimes a developer chooses a scaling factor that leads to a number of slots equal to the number of high-level language lines. For example, for a program of 1000 lines which got converted to 8000 machine-language instructions, one would choose a scaling factor of 8:1 so that we get about 1000 slots. Other programs act on the histogram data to display useful information. For example, the 'gprof' program on AIX maps the addresses in the histogram to names of function and prints out how much time was spent in each routine. It does this by assuming that if one program counter located in the address is seen once, that function was executed for 10 ms. If it identifies 20 of them, it assumes that the program spent 2000 ms (20×10=2000 ms) in that function. Large histogram buffer 140 is not a pinned buffer and, in one embodiment, is allocated by the program that is requesting to be profiled. In this embodiment, the program passes the address of the large histogram buffer to the kernel's profile( ) routine.

If a program has 10,000 lines of machine-level language instructions, then there would be 10,000 slots in the large histogram buffer. Using a scaling factor of 2:1, the same program would have 5,000 slots. However, increasing the scaling factor reduces precision because the same slot is updated whenever either program counter 1 or 2 is encountered. The width of each slot in large histogram buffer 140 is at least one byte in order to store a counter indicating the number of times the corresponding program counter (or range of program counters) was encountered. A one byte counter would allow a maximum number of 255 as a counter, while a two byte counter would allow a maximum counter value of 65,535. In many applications, a two byte counter is preferred, so the size of large histogram buffer 140 for a program of 10,000 lines would be 20,000 bytes. Using a 1:1 scaling factor, the resulting large histogram buffer, after profiling, would reveal the number of times each of the program counters was encountered. The programmer can then analyze the large histogram buffer for program inefficiencies or bugs (i.e., finding a loop that iterates more times than necessary, etc.).

Figure 2:
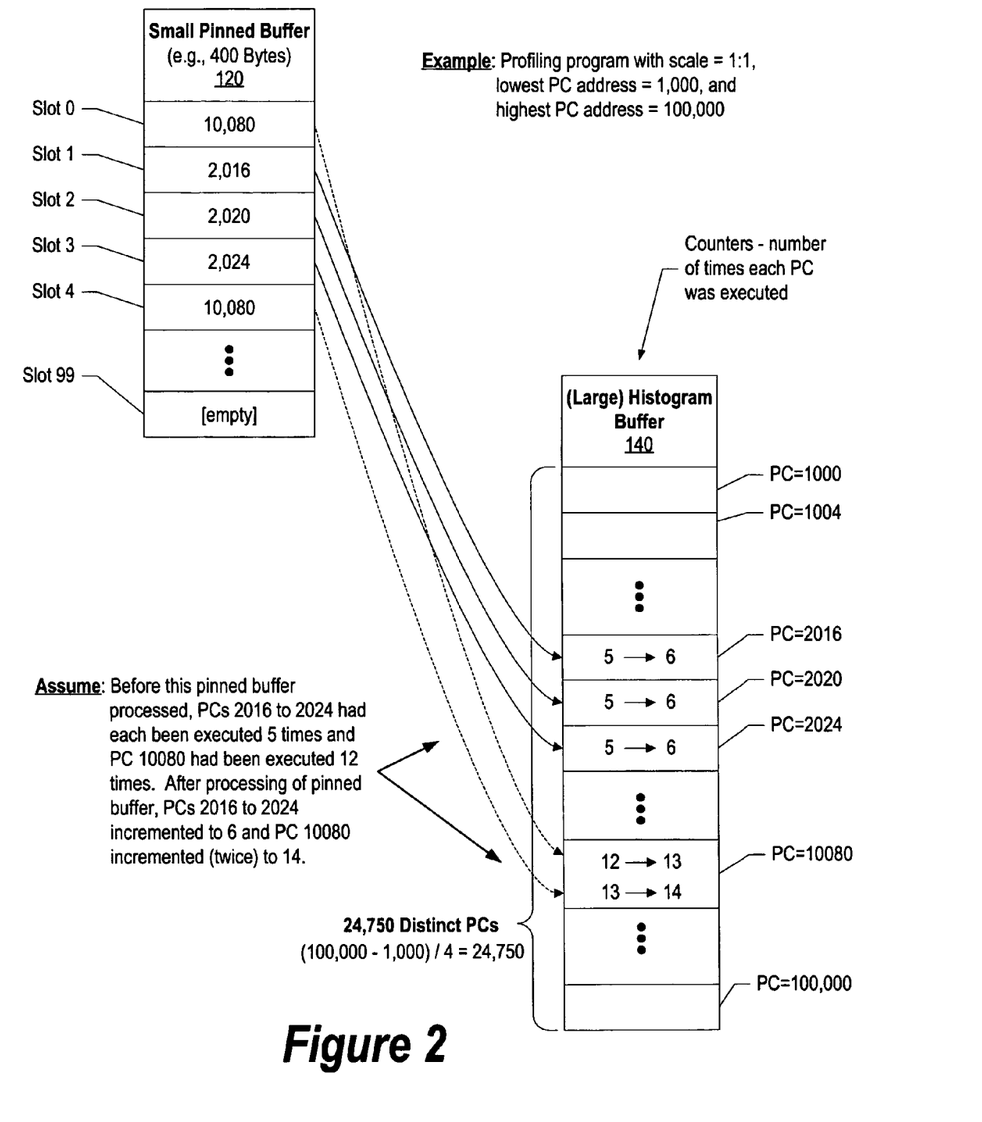
FIG. 2 is a diagram showing an example of program counters stored in the small pinned buffer and used to update histogram values in the histogram buffer.

FIG. 2 is a diagram showing an example of program counters stored in the small pinned buffer and used to update histogram values in the histogram buffer. FIG. 2 is similar to FIG. 1 with example data being stored in small pinned buffer 120 and results computed and stored in large histogram buffer 140. In the example shown, a program is being profiled using a 1:1 scaling factor. The lowest program counter of the program is 1,000, and the largest program counter is 100,000. The number of distinct program counters, in a 32-bit system, is 24,750 (100,000−1,000/4 bytes per address=24,750). If the size of each of the large histogram buffer's slots is one byte, then the size of the large histogram buffer is 24,750 bytes, while if the slots is two bytes, then the size of the large histogram buffer is 49,500 bytes.

Small pinned buffer 120 stores the program counters encountered before the small pinned buffer is processed, updating large histogram buffer 140. Small pinned buffer 120 is used over and over again. When the small pinned buffer is almost full, the program counters stored in the small pinned buffer are used to update large histogram buffer 140 and then the slots in small pinned buffer 120 are reused starting at slot 0 until the small pinned buffer is almost full, at which time the small pinned buffer is once again processed and the program counters stored in the small pinned buffer are used to update the counters in large histogram buffer 140.

Program counters are shown in five slots of small pinned buffer 120 (slots 0 through slot 4 have program counter values of 10,080, 2,016, 2,020, 2,024, and 10,080. So, while sampling the process' program counter, program counter values of 10,080, 2,016, 2,020 and 2,024 were encountered. While sampling the program counter, the program counter value of 10,080 was encountered once again. These program counter values were each stored in small pinned buffer 120. Before these values in small pinned buffer 120 were processed, program counters 2,016 through 2,024 had each been sampled five times and program counter 10,080 had been sampled 12 times.

When slot 0 of the small pinned buffer is processed, the slot in large histogram buffer 140 corresponding to program counter 10,080 is incremented from 12 to 13. When slot 1 of the small pinned buffer is processed, the slot in large histogram buffer 140 corresponding to program counter 2,016 is incremented from 5 to 6. Likewise, when slot 2 of the small pinned buffer is processed, the slot in large histogram buffer 140 corresponding to program counter 2,020 is also incremented from 5 to 6, and when slot 3 of the small pinned buffer is processed, the slot in large histogram buffer 140 corresponding to program counter 2,024 is also incremented from 5 to 6. Finally, when slot 4 of the small pinned buffer is processed, the slot in large histogram buffer 140 corresponding to program counter 10,080 is incremented from 13 to 14. The remaining slots of small pinned buffer that have data would be similarly processed. As can be seen, a single program counter can appear multiple times in small pinned buffer, such as program counter 10,080 appearing in both slots 0 and 4, resulting in the counter in large histogram buffer 140 corresponding to 10,080 being incremented twice. In one embodiment, the small pinned buffer is processed before it is completely full. In such an embodiment, not all slots in the small pinned buffer will contain data (such as slot 99 being "empty").

In addition, in another embodiment in an environment where extensive looping takes place (i.e., where the same program counters are likely to be encountered multiple times in the small pinned buffer), the small pinned buffer can be pre-processed with an additional counter stored in small pinned buffer that indicates the number of times the program counter appears in the small pinned buffer. In this embodiment, an array is created with the program counter and the number of times the program counter appears in the small pinned buffer. In the example shown, program counter 10,080 would have a value of two (2) while the others would have a value of one (1). In this embodiment, when updating the large histogram buffer, the slot in the large histogram buffer only has to be computed once and the counter from the small pinned buffer (such as 2 for program counter 10,080) is added to the counter currently stored in the slot corresponding to the program counter (e.g., 10,080). So in the example, program counter 10,080's counter of 12 would be updated to 14 in one update rather than two.

Figure 3:
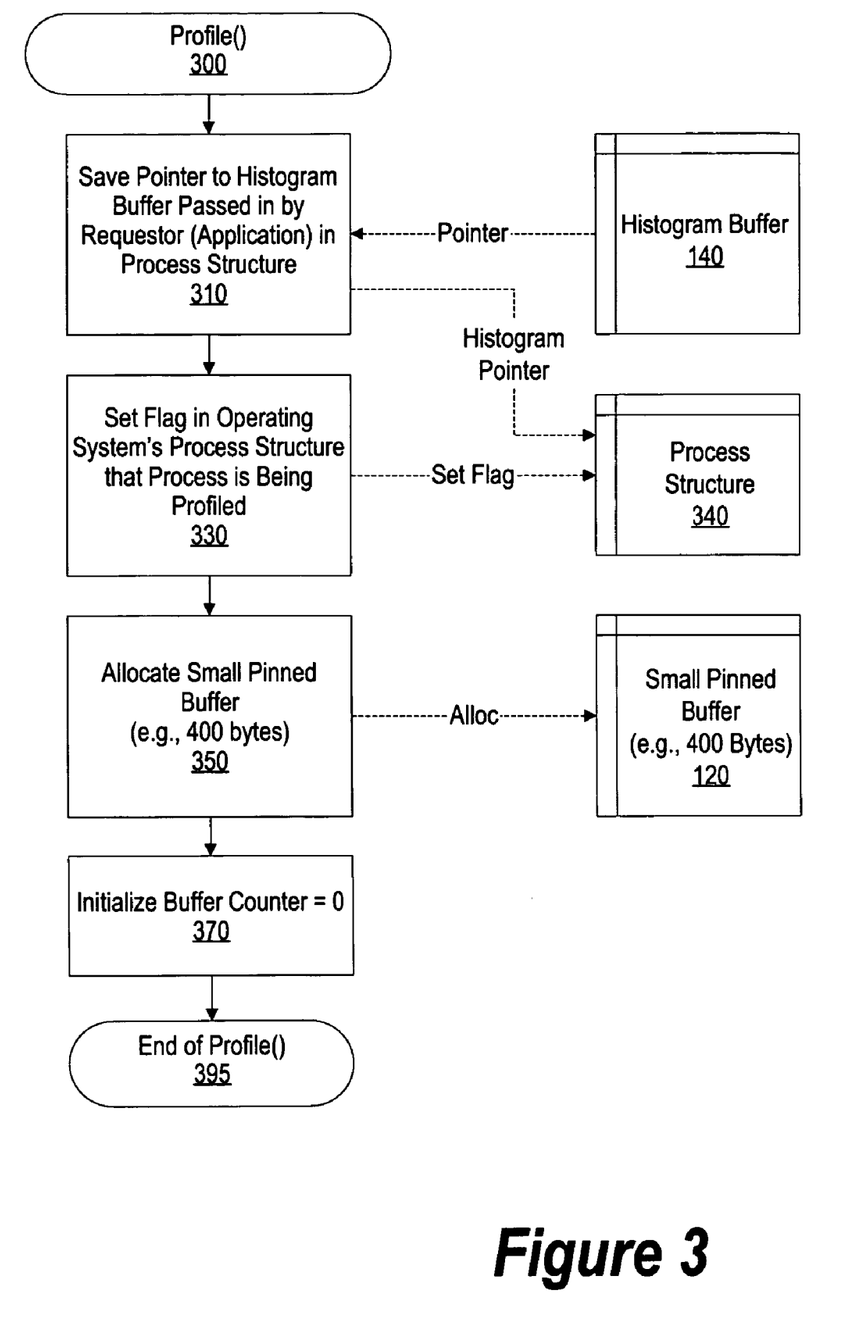
FIG. 3 is a flowchart showing steps taken during the profile routine when a program requests to be profiled.

FIG. 3 is a flowchart showing steps taken during the profile routine when a program requests to be profiled.

Processing of the profile( ) routine commences at 300 whereupon, at step 310, a pointer (address) of large histogram buffer 140 is received from the process that is calling the profile( ) routine and saved in process structure 340. Process structure 340 corresponds to the process that is being profiled. Process structures are used by the kernel to keep track of the various processes currently running in the system.

At step 330, the profile( ) routine sets a flag in process structure 340 indicting that the process is being profiled. At step 350, the profile( ) routine allocates small pinned buffer 120. In one embodiment, step 350 includes computing the size of small pinned buffer 120.

The size is computed based upon factors such as the number of processes (threads) being profiled and any system memory constraints currently being encountered by the system. In another embodiment, the size of small pinned buffer 120 is fixed to store a certain number of entries.

At step 370, the buffer counter is initialized to zero (0) indicating that the next slot in the small pinned buffer to write to is slot number 0. Processing of the profile( ) routine ends at 395. Because the profile flag has been set in the process' process structure, the kernel will begin profiling the program during the process' next time slice.

Figure 4:
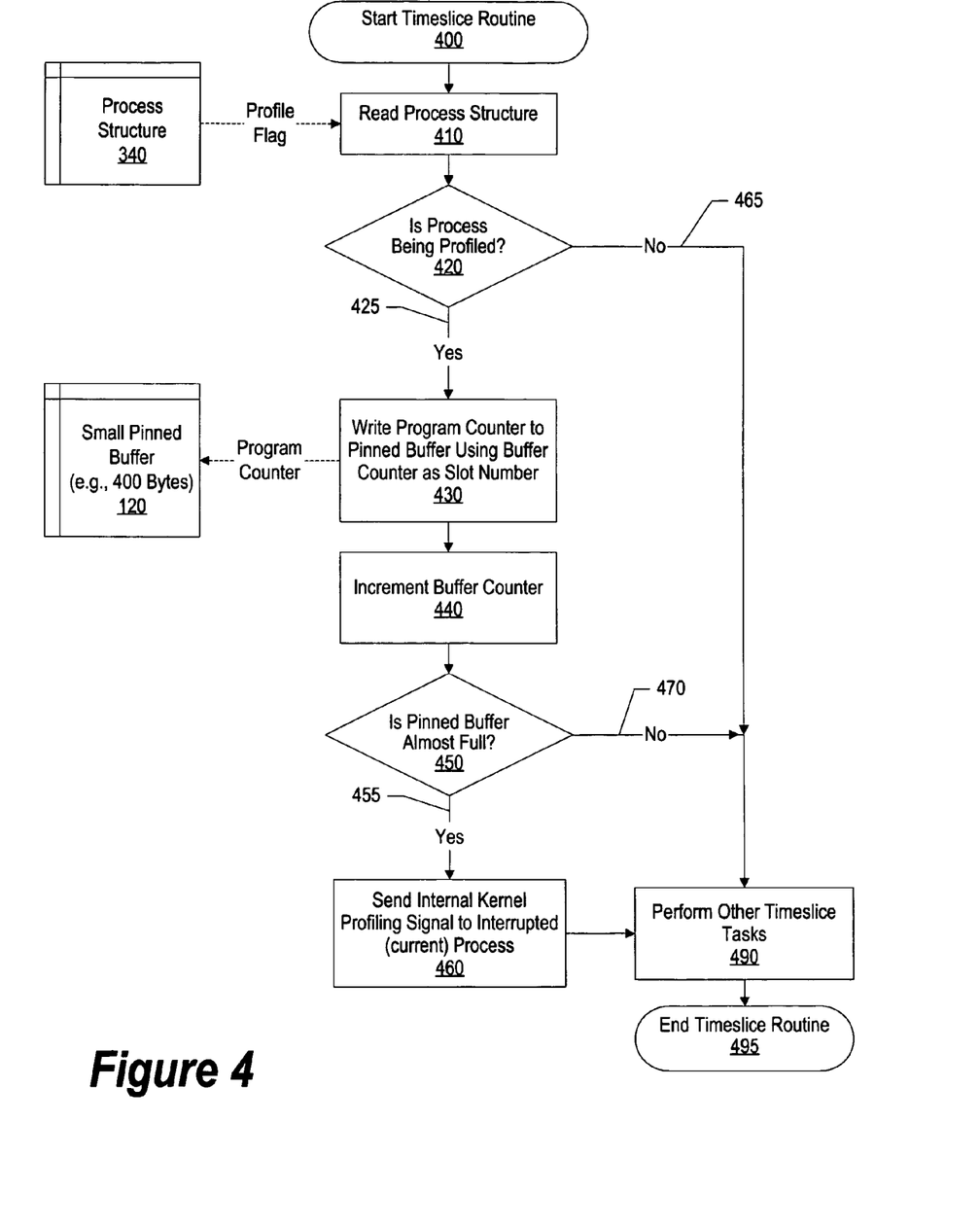
FIG. 4 is a flowchart showing steps taken during a time-slice of a program with particular emphasis on steps taken when the program is being profiled.

FIG. 4 is a flowchart showing steps taken during a time-slice of a program with particular emphasis on steps taken when the program is being profiled. Processing commences at 400 at the start of the time-slice routine. At step 410, the kernel reads the profile flag from the process' process structure 340. A determination is made as to whether, based on the profile flag, the process is currently being profiled (decision 420).

If the process is currently being profiled (i.e., the profile flag is "true"), then decision 420 branches to "yes" branch 425 to perform profiling operations. At step 430, the process' program counter is written to small pinned buffer 120 using the buffer counter as the slot number within small pinned buffer to which the program counter is written. At step 440 the buffer counter is incremented so that the next time this routine is executed, the process' program counter will be written to the next slot in the small pinned buffer.

A determination is made as to whether small pinned buffer 120 is "almost" full (decision 450). Waiting until the buffer is completely full may cause the buffer to overflow if additional program counters are written to the small pinned buffer before the buffer can be processed. Instead, the condition is set to occur when the buffer is "almost" full, such as 80 or 90 percent full, depending upon the size of the small pinned buffer as well as other system characteristics (such as how fast program counters are being written to the small pinned buffer). If the small pinned buffer is almost full, decision 450 branches to "yes" branch 455 whereupon, at step 460, an internal kernel profiling signal is sent to interrupt the current process that is being profiled. Details of the steps that occur in processing the interrupt are shown in FIGS. 5 and 6 and the detailed description corresponding thereto.

Step 490 performs other time-slice tasks for the process that has the time-slice. This step is performed regardless of whether the process is being profiled (decision 420) and regardless of whether the small pinned buffer is almost full (decision 450). Returning to decision 420, if the process is not being profiled, decision 420 branches to "no" branch 465 leading to step 490. Returning to decision 450, if the small pinned buffer is not almost full, decision 450 branches to "no" branch 470 again leading to step 490. Finally, step 490 is performed if the small pinned buffer is almost full (decision 450 branching to "yes" branch 455) after the profiling signal has been sent in step 460. After other time-slice tasks have been performed, the time-slice routine ends at 495.

Figure 5:
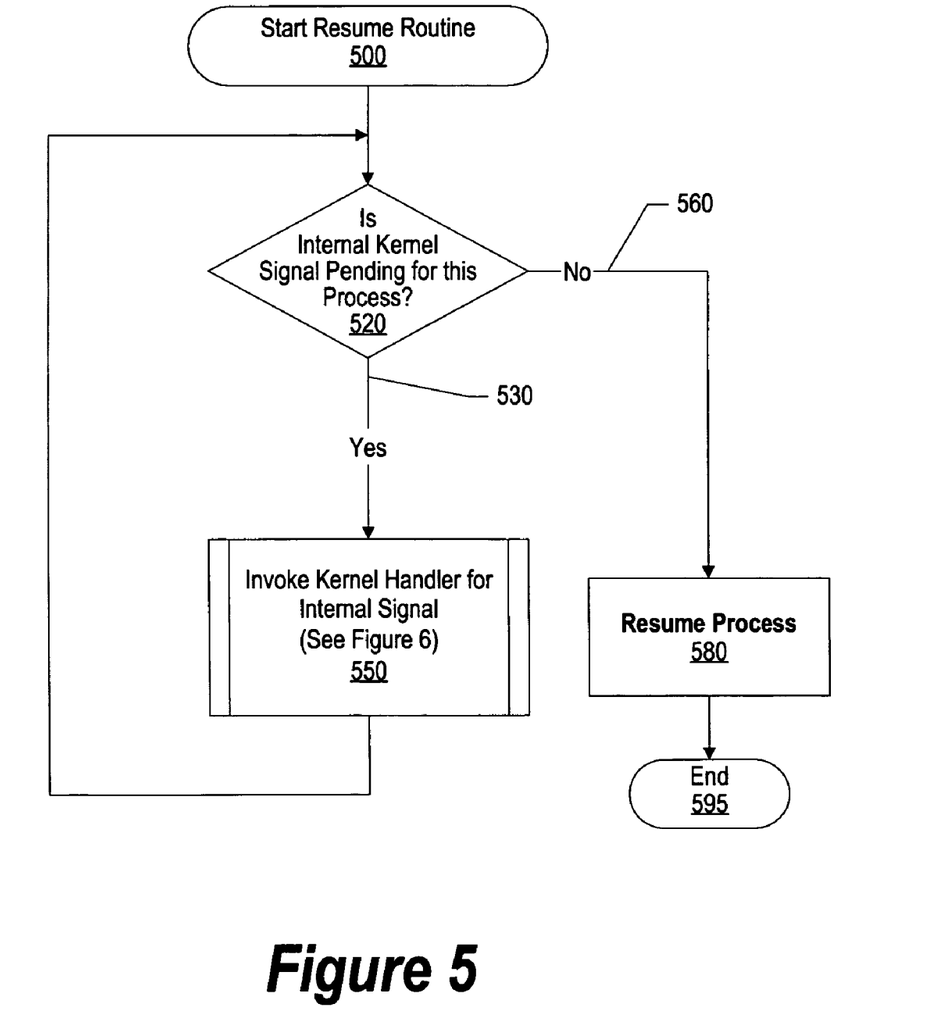
FIG. 5 is a flowchart showing steps taken when resuming a process when it is being profiled.

FIG. 5 is a flowchart showing steps taken when resuming a process. Processing commences at 500 whereupon a determination is made as to whether an internal kernel signal is currently pending for the process that is being resumed (decision 520). If an internal kernel signal is pending for the process, decision 520 branches to "yes" branch 530 whereupon the kernel handler for the internal signal is invoked (predefined process 550, see FIG. 6 and corresponding text for processing details). When the kernel handler finishes and passes control back to the resume routine, processing loops back to determine if there are any more internal kernel signals pending for the process. This looping continues until all pending internal kernel signals have been processed by invoking the appropriate kernel handlers. When there are no more pending internal kernel signals, decision 520 branches to "no" branch 560 whereupon, at step 580, the process resumes. The resume routine thereafter ends at 595. For the profiling process, there is usually either one pending kernel signal or no pending kernel signals.

Figure 6:
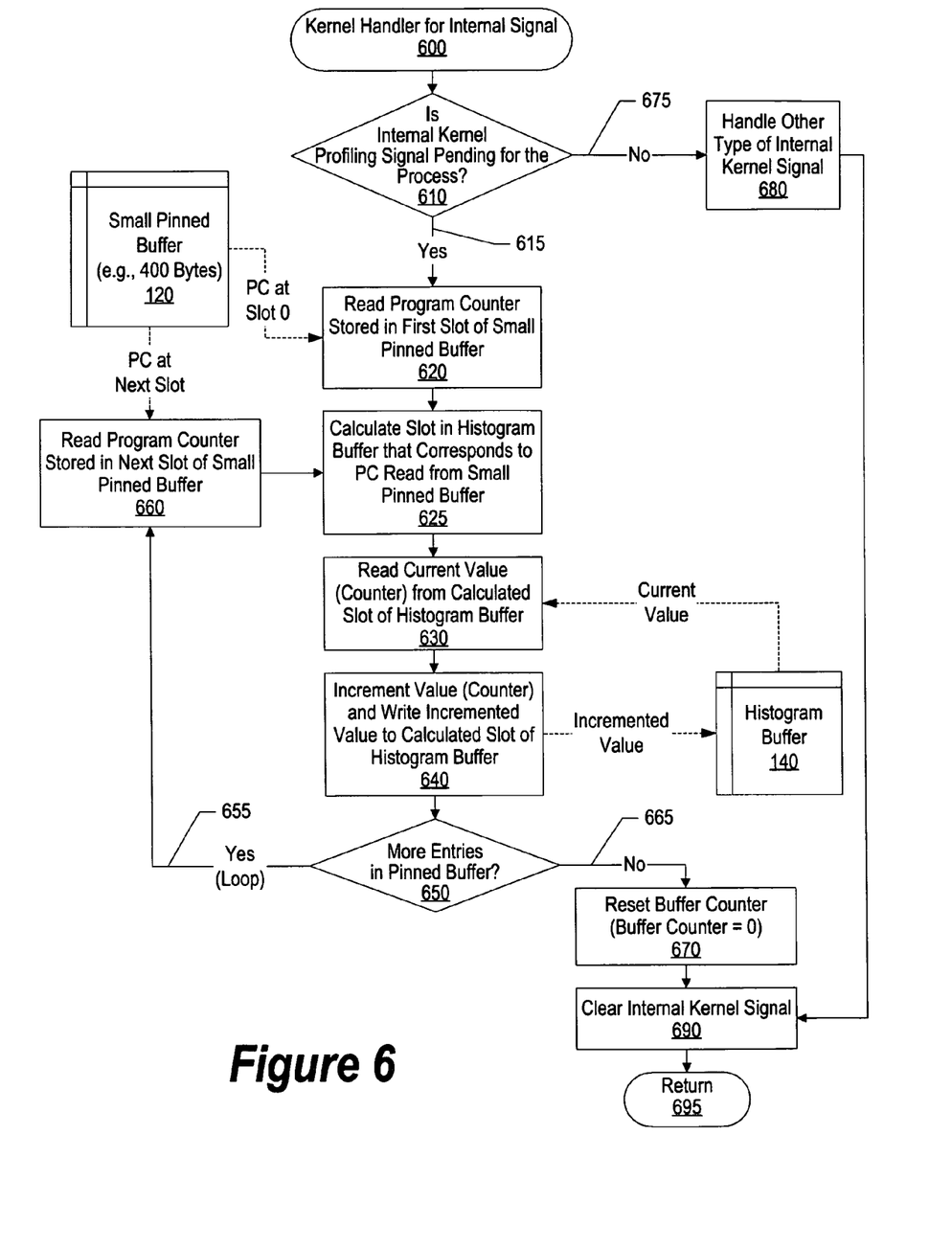
FIG. 6 is a flowchart showing steps taken by the kernel handler to update the large histogram buffer and clear the small-pinned buffer when the small-pinned buffer is almost full.

FIG. 6 is a flowchart showing steps taken by the kernel handler to update the large histogram buffer and clear the small-pinned buffer when the small-pinned buffer is almost full. Processing commences at 600 whereupon a determination is made as to whether the internal kernel signal that is pending is a profiling signal that indicates that the small pinned buffer used to gather program counters for the profiled process is almost full (decision 610). If the profiling signal is pending, decision 610 branches to "yes" branch 615 in order to process the small pinned buffer corresponding to the process that is being profiled.

At step 620, the program counter stored in the first slot (slot 0) of small pinned buffer 120 is read. The slot in histogram buffer 140 that corresponds to the program counter that was just read is calculated at step 625. The calculation is based upon the lowest program counter value and whether any scaling is taking place. For example, if the program counter that was read at step 620 is the one-hundredth program counter for the routine, then the one-hundredth slot (slot 99) of histogram buffer 140 corresponds to the program counter if 1:1 scaling is being used. However, if 2:1 scaling is being used, then the fiftieth slot (slot 49) of histogram buffer 140 corresponds to the program counter.

At step 630, the current value (i.e., the counter) stored in the slot of the histogram buffer that was calculated in step 625 is read. At step 640, the value that was read from the slot in the histogram buffer is incremented by one and written back to the slot in the histogram buffer. A determination is made as to whether there are more entries to process in small pinned buffer 120. In one embodiment, the number of entries to process from the small pinned buffer is based upon the buffer counter. For example, if the small pinned buffer has enough space to store 100 program counters but the buffer counter is 81, then the first 81 entries from the small pinned buffer are processed.

If there are more entries to process in the small pinned buffer, decision 650 branches to "yes" branch 655 whereupon the program counter stored in the next slot of the small pinned buffer is read and processing loops back to calculate the slot in the large histogram buffer that corresponds to the program counter, read the current value (counter) from the calculated slot, increment the counter, and write the new value (counter) back to the slot in the large histogram buffer. This looping continues until all entries in the small pinned buffer have been processed, at which point decision 650 branches to "no" branch 665.

After all of the entries in the small pinned buffer have been processed (decision 650 branching to "no" branch 665), at step 670 the buffer counter is reset to zero (0), and at step 690 the internal kernel signal is cleared. Returning to decision 610, if the signal that is pending is not the profiling signal (indicating that the small pinned buffer is almost full), then decision 610 branches to "no" branch 675 whereupon, at step 680 some other type of internal kernel signal is handled and the signal is cleared at step 690. After the signal has been handled by the kernel handler, kernel handling ends at 695.

Figure 7:
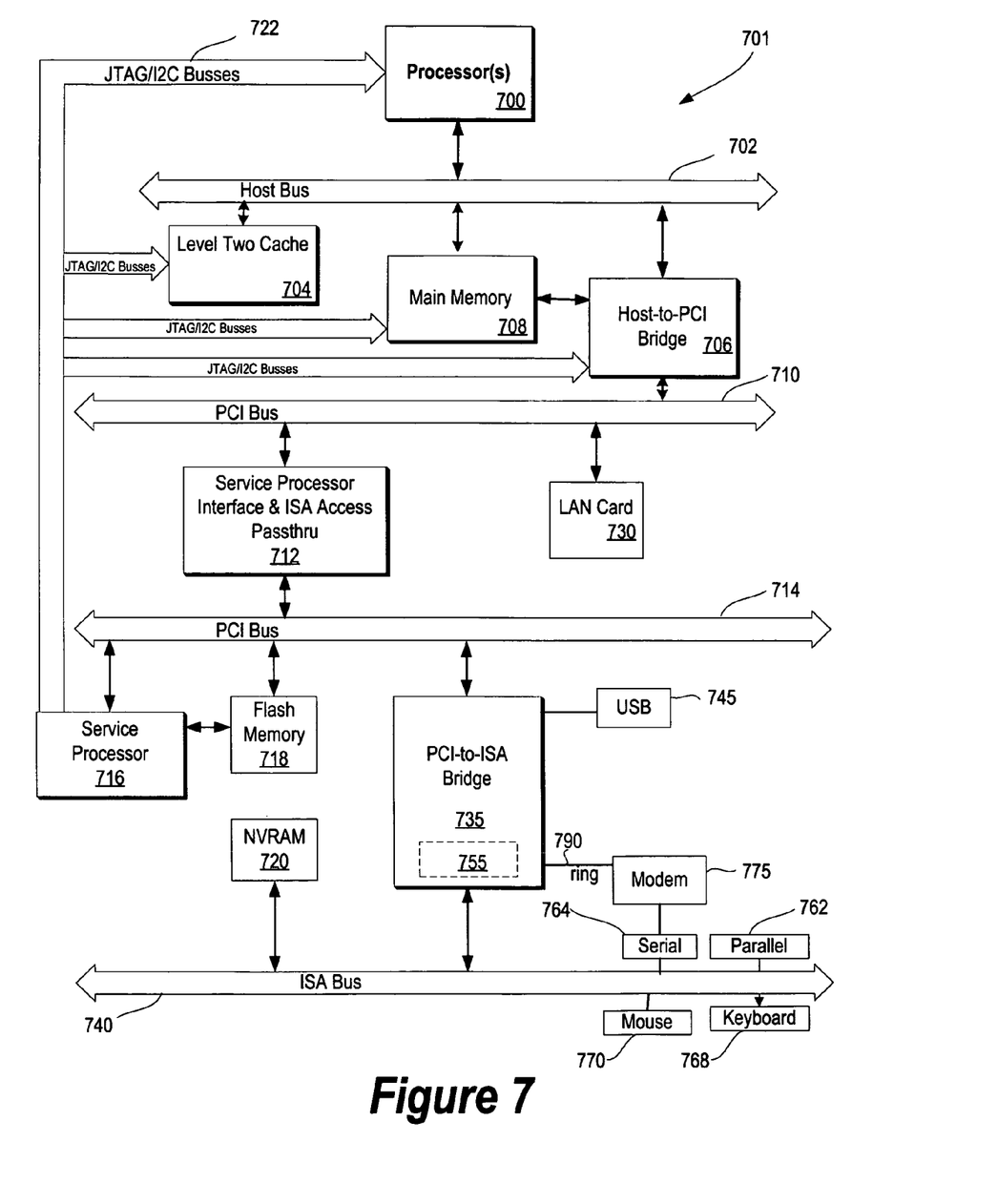
FIG. 7 is a block diagram of a computing device capable of implementing the present invention.

FIG. 7 illustrates information handling system 701, which is a simplified example of a computer system capable of performing the computing operations described herein. Computer system 701 includes processor 700, which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer.

Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of profiling a process executing on a processor, the method comprising:
   receiving a profiling request from the process, the profiling request including a pointer to an unpinned histogram buffer that was allocated by the process in a memory;
   setting a flag in a data structure corresponding to the process indicating that the process is being profiled;
   allocating, by a kernel routine, a small pinned buffer in the memory, wherein the unpinned histogram buffer is larger than the small pinned buffer;
   initializing a buffer counter used to count the number of entries recorded in the small pinned buffer, wherein the small pinned buffer is allocated by a kernel routine;
   recording, in the small pinned buffer, a plurality of program counters encountered while executing the process until a threshold number of program counters recorded in the small pinned buffer is reached;
   incrementing the buffer counter each time one of the plurality of program counters is recorded in the small pinned buffer;
   in response to reaching the threshold number of program counters:
      for each program counter recorded in the small pinned buffer:
         calculating a slot within the unpinned histogram buffer that corresponds to the program counter;
         reading a counter from the calculated slot;
         incrementing the counter; and
         writing the counter back to the calculated slot; and
      clearing the small pinned buffer after each program counter recorded in the small pinned buffer has been processed, wherein the clearing of the small pinned buffer includes resetting the buffer counter.

* * * * *